US009702719B2

(12) United States Patent
Mason et al.

(10) Patent No.: US 9,702,719 B2
(45) Date of Patent: Jul. 11, 2017

(54) VEHICLE ROUTE SELECTION BASED ON ENERGY USAGE

(71) Applicant: TELOGIS, INC., Aliso Viejo, CA (US)

(72) Inventors: Ralph James Mason, Christchurch (NZ); Jason Mathew Koch, Huntington Beach, CA (US); Howard Jelinek, Laguna Beach, CA (US)

(73) Assignee: Telogis, Inc., Aliso Viejo, CA (US)

( * ) Notice: Subject to any disclaimer, the term of this patent is extended or adjusted under 35 U.S.C. 154(b) by 0 days.

(21) Appl. No.: 14/878,590

(22) Filed: Oct. 8, 2015

(65) Prior Publication Data

US 2016/0258770 A1 Sep. 8, 2016

Related U.S. Application Data

(60) Division of application No. 14/256,265, filed on Apr. 18, 2014, now Pat. No. 9,157,756, which is a
(Continued)

(51) Int. Cl.
*G01C 21/34* (2006.01)
*G01C 21/36* (2006.01)
(Continued)

(52) U.S. Cl.
CPC ..... *G01C 21/3469* (2013.01); *G01C 21/3484* (2013.01); *G01C 21/3617* (2013.01);
(Continued)

(58) Field of Classification Search
CPC ............ G01C 21/3469; G01C 21/3484; G01C 21/3617; G06Q 10/0833;
(Continued)

(56) References Cited

U.S. PATENT DOCUMENTS

| | | | |
|---|---|---|---|
| 5,486,822 A | 1/1996 | Tenmoku et al. | |
| 5,938,720 A | 8/1999 | Tamai | |

(Continued)

FOREIGN PATENT DOCUMENTS

| | | |
|---|---|---|
| JP | 2012 141755 | 7/2012 |
| KR | 2002 0002954 | 1/2002 |
| KR | 10 2012 0078130 | 7/2012 |

OTHER PUBLICATIONS

Garmin, ecoRoute™ Owner's Manual Supplement, Jan. 2009, pp. 1-5.
(Continued)

*Primary Examiner* — Jason Holloway

(57) ABSTRACT

Vehicle management systems and associated processes can consider energy consumption when selecting routes for fleet vehicles. Vehicle management systems and associated processes are described that, in certain embodiments, evaluate vehicle energy usage based on factors such as terrain or elevation, vehicle characteristics, driver characteristics, road conditions, traffic, speed limits, stop time, turn information, traffic information, and weather information, and the like. The features described herein may also be implemented for non-fleet vehicles, such as in personal vehicle navigation systems.

16 Claims, 10 Drawing Sheets

Related U.S. Application Data continuation of application No. 12/954,547, filed on Nov. 24, 2010, now Pat. No. 8,706,409.

(60) Provisional application No. 61/281,859, filed on Nov. 24, 2009.

(51) Int. Cl.
| | |
|---|---|
| *G06Q 10/06* | (2012.01) |
| *G06Q 10/04* | (2012.01) |
| *G08G 1/00* | (2006.01) |
| *G06Q 10/08* | (2012.01) |

(52) U.S. Cl.
CPC .............. *G06Q 10/06311* (2013.01); *G06Q 10/063112* (2013.01); *G06Q 10/0833* (2013.01); *B60W 2540/28* (2013.01); *G06Q 10/047* (2013.01); *G06Q 10/083* (2013.01); *G08G 1/20* (2013.01)

(58) Field of Classification Search
CPC ..... G06Q 10/063112; G06Q 10/06311; G06Q 10/047; G06Q 10/083; G08G 1/20; B60W 2540/28

See application file for complete search history.

(56) References Cited

U.S. PATENT DOCUMENTS

| | | | |
|---|---|---|---|
| 6,026,346 | A | 2/2000 | Ohashi et al. |
| 7,433,889 | B1 | 10/2008 | Barton |
| 7,706,964 | B2 | 4/2010 | Horvitz et al. |
| 8,040,256 | B2 | 10/2011 | Rani et al. |
| 8,290,701 | B2 | 10/2012 | Mason et al. |
| 8,428,307 | B2 | 4/2013 | Bradai et al. |
| 8,509,987 | B2 | 8/2013 | Resner |
| 8,552,847 | B1 | 10/2013 | Hill |
| 8,630,768 | B2 | 1/2014 | McClellan |
| 8,706,409 | B2 | 4/2014 | Mason et al. |
| 9,008,888 | B1 | 4/2015 | Gravino et al. |
| 9,129,460 | B2 | 9/2015 | McClellan |
| 9,135,759 | B2 | 9/2015 | Baer et al. |
| 2001/0014849 | A1 | 8/2001 | King |
| 2002/0128773 | A1 | 9/2002 | Chowanic et al. |
| 2003/0031167 | A1 | 2/2003 | Singh et al. |
| 2003/0223408 | A1 | 12/2003 | Chen et al. |
| 2004/0088392 | A1 | 5/2004 | Barrett et al. |
| 2005/0171692 | A1 | 8/2005 | Hamblen et al. |
| 2006/0100777 | A1* | 5/2006 | Staton ............... B60R 25/00 701/468 |
| 2007/0173993 | A1* | 7/2007 | Nielsen ............... G07C 5/085 701/33.4 |
| 2007/0276582 | A1 | 11/2007 | Coughlin |
| 2008/0235688 | A1 | 9/2008 | Panttaja et al. |
| 2008/0249667 | A1* | 10/2008 | Horvitz ............... B60W 40/072 701/1 |
| 2008/0294339 | A1 | 11/2008 | Tauchi et al. |
| 2009/0048774 | A1 | 2/2009 | Yoshioka |
| 2009/0063045 | A1 | 3/2009 | Figueroa et al. |
| 2009/0079555 | A1* | 3/2009 | Aguirre De Carcer .......... G07C 5/008 340/441 |
| 2009/0234521 | A1 | 9/2009 | Kumar et al. |
| 2009/0248587 | A1* | 10/2009 | Van Buskirk ....... G06Q 50/188 705/80 |
| 2009/0248605 | A1 | 10/2009 | Mitchell et al. |
| 2009/0254272 | A1 | 10/2009 | Hendrey |
| 2010/0017110 | A1* | 1/2010 | Sengoku ............ G01C 21/3469 701/532 |
| 2010/0036606 | A1 | 2/2010 | Jones |
| 2010/0121565 | A1 | 5/2010 | Uyeki |
| 2010/0145609 | A1* | 6/2010 | Boss ................... G06Q 30/018 701/22 |
| 2010/0153005 | A1 | 6/2010 | Cerecke et al. |
| 2010/0188288 | A1 | 7/2010 | Bahlmann et al. |
| 2010/0312466 | A1 | 12/2010 | Katzer et al. |
| 2011/0041088 | A1 | 2/2011 | Mason et al. |
| 2011/0112747 | A1 | 5/2011 | Downs et al. |
| 2011/0184642 | A1* | 7/2011 | Rotz ................... G01C 21/3492 701/533 |
| 2011/0224898 | A1 | 9/2011 | Scofield |
| 2011/0225068 | A1 | 9/2011 | Figueroa et al. |
| 2011/0238457 | A1 | 9/2011 | Mason et al. |
| 2011/0264366 | A1 | 10/2011 | Cabral |
| 2012/0016576 | A1* | 1/2012 | Huang ............... G01C 21/3469 701/423 |
| 2012/0022904 | A1 | 1/2012 | Mason et al. |
| 2012/0123632 | A1 | 5/2012 | Nejah |
| 2012/0197504 | A1 | 8/2012 | Sujan et al. |
| 2012/0226390 | A1 | 9/2012 | Adams et al. |
| 2012/0307064 | A1 | 12/2012 | Schenken |
| 2013/0211660 | A1 | 8/2013 | Mitchell |
| 2014/0046585 | A1 | 2/2014 | Morris, IV et al. |
| 2014/0074391 | A1 | 3/2014 | Tate, Jr. |
| 2014/0195310 | A1 | 7/2014 | McQuade |
| 2015/0197247 | A1 | 7/2015 | Ichinokawa |

OTHER PUBLICATIONS

International Search Report and Written Opinion mailed on Feb. 14, 2011 for PCT Application No. PCT/US2010/058113.

International Search Report dated Nov. 21, 2013, International Application No. PCT/US2013/054009.

Australian Office Action First Patent Examination Report, issued Oct. 25, 2014, for corresponding application No. 2010324651, in 3 pages.

Chinese Notice of the First Office Action for Corresponding App No. 201080062233.4, mailed Nov. 4, 2014, in 25 pages.

\* cited by examiner

VEHICLE ROUTE SELECTION BASED ON ENERGY USAGE

PRIORITY INFORMATION

This application is a divisional of U.S. application Ser. No. 14/256,265, filed Apr. 18, 2014, entitled "VEHICLE ROUTE SELECTION BASED ON ENERGY USAGE," which is a continuation of U.S. application Ser. No. 12/954,547, filed Nov. 24, 2010, entitled "VEHICLE ROUTE SELECTION BASED ON ENERGY USAGE," which claims the benefit of priority under 35 U.S.C. §119(e) to U.S. Provisional Patent Application No. 61/281,859, filed on Nov. 24, 2009, entitled "VEHICLE ROUTE OPTIMIZATION AND NAVIGATION USING LEAST ENERGY/FUEL," the disclosure of each of which is hereby incorporated by reference herein in its entirety.

BACKGROUND

Route selection or optimization has applications in vehicle routing, printed wire circuit layout, chip design and layout, and biological activities. Trucking and other vehicle fleets, for instance, select vehicle routes to deliver goods to various destinations. Similarly, transportation companies route vehicles to pick up and drop off passengers. In addition to land-based vehicles, route selection can also be used for ship, airplane, and rail transport route scheduling.

A typical route selection problem is to reduce or minimize the distance traveled or time spent traveling. Route selection problems might consider such factors as a number of turns in a given route, a number of intersections, speed limits, bridge crossings, and the like. Algorithms modeled using concepts from graph theory are often used to select routes.

SUMMARY

In accordance with some embodiments, a method of optimizing energy use of a vehicle includes identifying a starting waypoint and a destination waypoint. The starting waypoint and the destination waypoint can include three-dimensional location data having a latitude component, a longitude component, and an elevation component. The method can also include determining a plurality of candidate transportation routes from the starting waypoint location to the destination waypoint location based, at least in part, on shortest distance or shortest transit time. The method can further include calculating an energy use estimate or energy use cost for each of the candidate transportation routes. The method can also include ranking the candidate transportation routes based, at least in part, on the calculated energy use estimate or energy use cost of each of the candidate transportation routes. The method can further include identifying a preferred transportation route from the candidate transportation routes based, at least in part, on the calculated energy use estimate or energy use costs of the candidate transportation routes. The method can also include outputting the preferred transportation route.

In some embodiments, a system for optimizing energy use of a vehicle includes a computer system including computer hardware that can identify a starting waypoint and a destination waypoint, wherein the starting waypoint and the destination waypoint comprise three-dimensional location data having a latitude component, a longitude component, and an elevation component. The computer system can also determine a plurality of candidate transportation routes from the starting waypoint location to the destination waypoint location and calculate an energy use estimate or energy use cost for each of the candidate transportation routes. The computer system can further rank the candidate transportation routes based, at least in part, on the calculated energy use estimate or energy use cost of each of the candidate transportation routes. The computer system can also identify a preferred transportation route from the candidate transportation routes based, at least in part, on the calculated energy use estimate or energy use costs of the candidate transportation routes.

In accordance with some embodiments, a method for optimizing energy use of a vehicle includes determining a vehicle speed recommendation for at least a portion of an identified transportation route. The vehicle speed recommendation can be calculated to reduce energy use along the portion of the identified transportation route. In some embodiments, the determined vehicle speed recommendation is lower than a posted speed limit for the portion of the identified transportation route.

In some embodiments, a method for dynamically optimizing energy usage of a vehicle includes selecting a preferred transportation route for a driver of a vehicle from a plurality of candidate transportation routes based, at least in part, on an energy use estimate or energy use cost associated with the preferred transportation route. The method can also include receiving real-time data having a potential to affect the energy use estimate or energy use cost of the preferred transportation route. The method can further include determining a plurality of candidate transportation routes from the current location of the vehicle to a destination waypoint location and calculating an energy use estimate or energy use cost for each of the candidate transportation routes based, at least in part, on the received real-time data. The method can also include ranking the candidate transportation routes based, at least in part, on the calculated energy use estimate or energy use cost of each of the candidate transportation routes; and selecting a new preferred transportation route from the candidate transportation routes based, at least in part, on the calculated energy use estimate or energy use costs of the candidate transportation routes.

In accordance with some embodiments, a method for optimizing energy use of a vehicle includes identifying a plurality of destinations to be visited. The method can also include identifying two or more vehicles to potentially assign to a transportation route, each vehicle having a corresponding vehicle type. The method can further include identifying two or more drivers capable of operating the vehicles, each driver having a corresponding driver profile. The method can also include determining one or more sets of a vehicle, a driver, and a subset of the plurality of destinations configured to reduce a total amount of energy use by the vehicles to visit the plurality of destinations.

In some embodiments, a method of optimizing energy use includes identifying a starting waypoint and a destination waypoint. The method can also include identifying two or more vehicles, each vehicle having a corresponding vehicle type and identifying two or more drivers, each driver having a corresponding driver profile. The method can further include determining a plurality of candidate transportation routes from the starting waypoint location to the destination waypoint location. The method can also include identifying a preferred transportation route for at least some of the driver and vehicle combinations, wherein the preferred transportation routes are identified based, at least in part, on a calculated energy use estimate or energy use cost of the preferred transportation routes. Further, the method can include selecting from the preferred transportation routes for the driver and vehicle combinations a final transportation route having a lowest energy use estimate or energy use cost.

In accordance with some embodiments, a method of route optimization for a vehicle includes identifying a plurality of alternative feasible routes based, at least in part, on shortest distance or shortest transit time. The method can also include determining an energy use cost for the identified feasible routes. The method can further include selecting a preferred route from the feasible routes based, at least in part, on the energy use costs.

In some embodiments, a method of route optimization for a vehicle includes identifying a starting waypoint and a destination waypoint. The method can also include identifying terrain characteristics information for a region surrounding the starting waypoint and the destination waypoint, the terrain characteristics information including elevation information. The method can further include determining feasible alternative routes from the starting waypoint to the destination waypoint based, at least in part, on the elevation information. Further, the method can include identifying an energy use cost for the feasible routes based, at least in part, on the elevation information and selecting a preferred route from the feasible routes having the lowest energy use cost.

The systems and methods described herein can be implemented by one or more computer systems comprising computer hardware.

For purposes of summarizing the disclosure, certain aspects, advantages and novel features of the inventions have been described herein. It is to be understood that not necessarily all such advantages may be achieved in accordance with any particular embodiment of the inventions disclosed herein. Thus, the inventions disclosed herein may be embodied or carried out in a manner that achieves or selects one advantage or group of advantages as taught herein without necessarily achieving other advantages as may be taught or suggested herein.

BRIEF DESCRIPTION OF THE DRAWINGS

The features of embodiments of the inventions disclosed herein are described below with reference to the drawings. Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

As mentioned above, route scheduling or route selection for a fleet of vehicles is often performed by considering shortest distance or least amount of transit time. For each vehicle in the fleet, it can be desirable to reduce the travel distance or transit time to increase the number of stops, deliveries, or the like that may be performed in a given time period. However, with rising fuel costs eroding transportation companies' bottom line, vehicle fleets can also benefit from considering routes that reduce fuel or other energy consumption.

Advantageously, this disclosure describes embodiments where energy consumption is considered when selecting routes for fleet vehicles. Vehicle management systems and associated processes are described that, in certain embodiments, evaluate vehicle energy usage based on factors such as terrain or elevation, vehicle characteristics, driver characteristics, road conditions, traffic, speed limits, stop time, turn information, traffic information, and weather information, and the like. The features described herein may also be implemented for non-fleet vehicles, such as in personal vehicle navigation systems. However, for ease of illustration, the remainder of this disclosure will describe routing systems in the context of vehicle fleets, such as fleets of service vehicles, trucks, taxis, other transportation vehicles, emergency vehicles, and the like.

II. Vehicle Management System Overview

Figure 1:
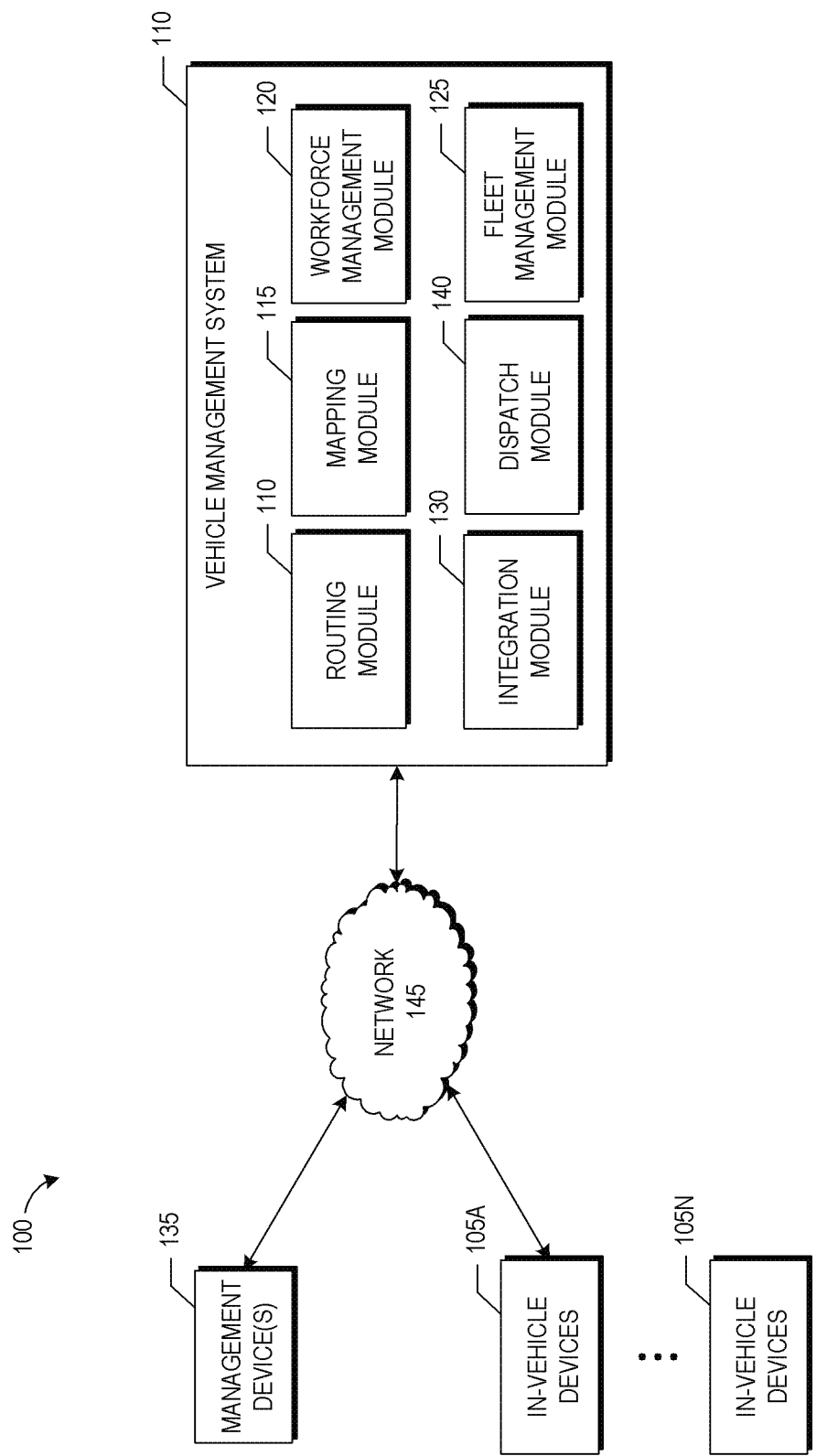
FIG. 1 illustrates an embodiment of a vehicle management system having a routing module that performs routing based on energy usage, among possibly other factors.

FIG. 1 illustrates an embodiment of a computing environment 100 for implementing an example vehicle management system 110. Among other features, the vehicle management system 110 can perform vehicle routing using energy usage considerations in addition to or instead of time and distance considerations.

In the computing environment 100, one or more in-vehicle devices 105A . . . 105N and management devices 135 communicate with the vehicle management system 110 over a network 145. The in-vehicle devices 105 can include computing devices installed in fleet vehicles. These devices 105 can include navigation functionality, routing functionality, and the like. The in-vehicle devices 105 can receive route information and other information from the vehicle management system 110. In addition, the in-vehicle devices 105 can report information to the vehicle management system 110, such as driver location, speed, energy consumption, and so forth.

The management devices 135 can be computing devices used by dispatchers, administrators, or other users to manage different aspects of the vehicle management system 110. For example, a user of a management device 135 can access the vehicle management system 110 to dispatch vehicles and drivers and perform other fleet management functions. With the management devices 135, users can access and monitor vehicle information obtained from the in-vehicle devices 105 by the vehicle management system 110. Such information can include data on energy usage, vehicle routes used, stops, driver behavior and performance, vehicle emissions, vehicle maintenance, and the like. In some embodiments, the management devices 135 are located at a dispatch center.

The vehicle management system 110 can be implemented by one or more physical computing devices, such as servers. These servers can be physically co-located or can be geographically separate, for example, in different data centers. Advantageously, in the depicted embodiment, the vehicle management system 110 includes a routing module 110 that can perform energy-based routing. The routing module 110 can select at least some routes for the vehicles that reduce energy use costs, improve operational efficiencies, improve customer service, and/or reduce vehicle emissions. The routing module 110 can automatically select routes that take into account factors that affect energy usage, such as terrain or elevation, vehicle characteristics, driver characteristics, road conditions, traffic, speed limits, stop time, turn information, traffic information, and weather information, and the like.

For example, given two equally feasible routes that would result in on-time deliveries for a delivery company, the routing module 110 may select the route with lowest energy cost based on one route having more level elevation than the other route. Due to the more level elevation, the chosen route can result in less energy consumption for some types of vehicles (such as gasoline vehicles).

The type of vehicle used can also factor into route selection. Many different types of vehicles can be used in a fleet managed by the vehicle management system 110. Some examples include gasoline powered vehicles (e.g., gas or diesel), electric vehicles, hybrid vehicles, and alternative fuel vehicles. Electric-vehicles can include battery-operated or solar power vehicles. Hybrid vehicles can operate using a combination of internal combustion and electric motor drives, while alternative fuel vehicles may be powered by such fuels as hydrogen, ethanol, biodiesel, propane, other petroleum-based products, or the like. Since different types of vehicles consume energy differently, the routing module 110 can select different routes for different vehicle types. Route selection based on vehicle type and other energy usage factors are described in detail below.

Other modules of the vehicle management system 110 include, in the depicted embodiment, a fleet management module 125, a mapping module 115, a workforce management module 120, an integration module 130, and a dispatch module 140. The fleet management module 125 can include functionality for managing vehicles in a fleet. For example, the fleet management module 125 can allow users to schedule and monitor vehicle preventative maintenance, vehicle operating costs, and the like. The mapping module 115 can provide mapping functionality that provides worldwide mapping data, including terrain or elevation data. The mapping module 115 can be accessed by the routing module 110 to provide mapping and elevation data for different routes. The mapping module 115 may also be accessed by the in-vehicle devices 105 in some embodiments.

The workforce management module 120 can provide communication functionality with the in-vehicle devices 105 or with drivers' mobile handheld devices (not shown) to connect drivers with the vehicle management system 110. The integration module 130 can facilitate integration of the vehicle management system 110 with other systems, such as fuel card systems, payroll systems, supply chain system, insurance systems, and the like. The dispatch module 140 can provide functionality for users of the management devices 135 to assign drivers and vehicles to routes selected by the routing module 110.

The illustrated network 145 may be a LAN, a WAN, the Internet, combinations of the same, or the like. For ease of illustration, the vehicle management system 110 has been depicted as a centralized system. However, in other implementations, at least some of the functionality of the vehicle management system 110 is implemented in other devices. For instance, the in-vehicle devices 105 may implement the routing functionality described herein. Other possible implementations of the vehicle management system 110 can include many more or fewer components than those shown in FIG. 1.

III. Routing Module Embodiments

Figure 2:
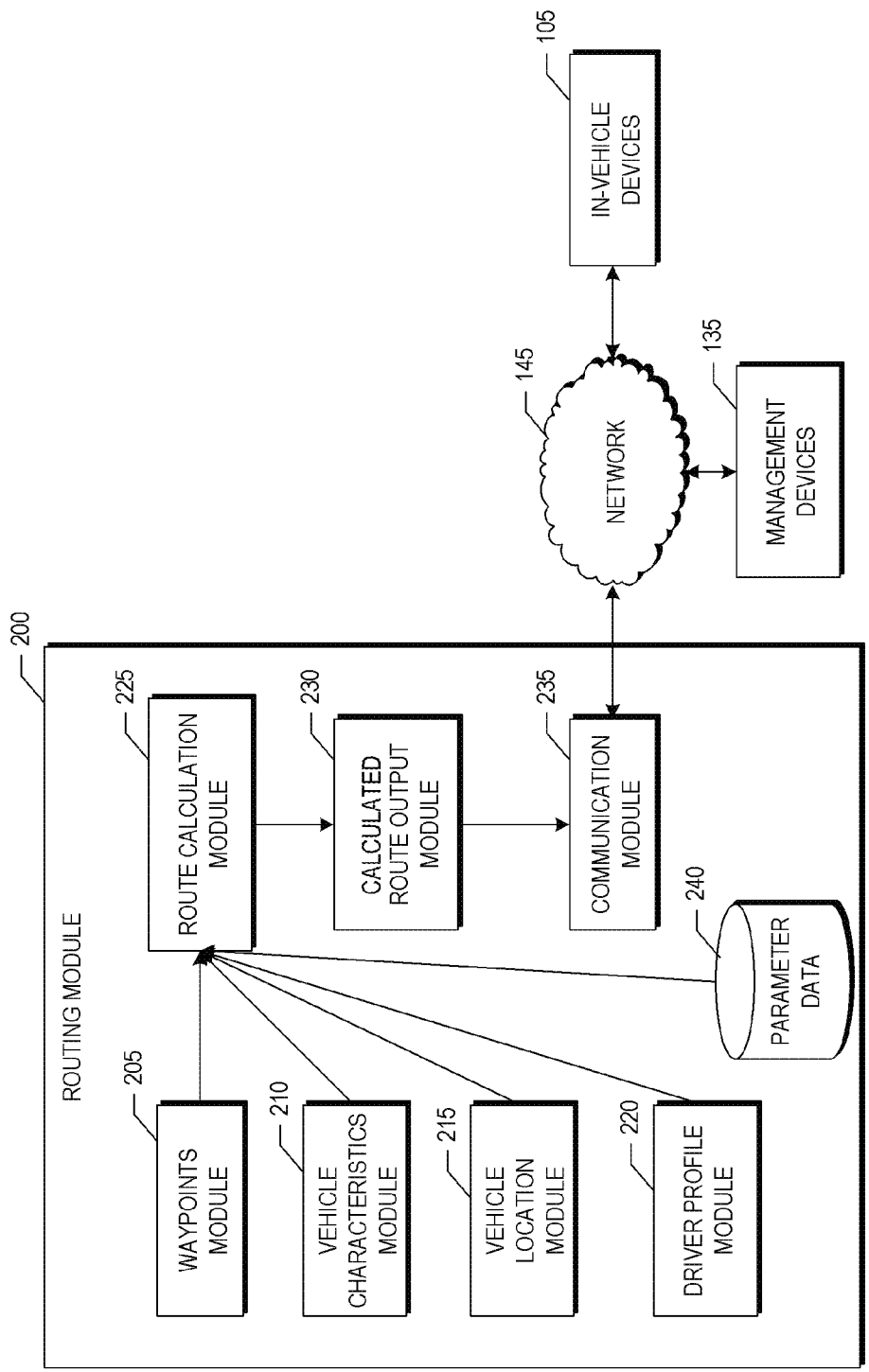
FIG. 2 illustrates an embodiment of a routing module usable with the system of FIG. 1.

Turning to FIG. 2, an embodiment of a routing module 200 is shown. The routing module 200 is a more detailed embodiment of the routing module 110 described above and includes all the features thereof. The routing module 200 can select a route that reduces or minimizes the energy use of a vehicle. In some embodiments, the routing module 200 can select routes that reduce energy use for multiple vehicles. In some embodiments, the routing module 200 can reduce energy usage based on any of the factors described above, for example, by selecting particular vehicles and/or particular drivers for a route based on their energy usage characteristics. The management devices 135 and in-vehicle devices 105 of FIG. 1 are also shown communicating with the routing module 200 over the network 145.

In the depicted embodiment, the routing module 200 includes a waypoints module 205, a vehicle characteristics module 210, a vehicle location module 215, a driver profile module 220, a route calculation module 225, a calculated route output module 230, and a communication module 235. The routing module 200 can also include one or more parameter databases or data repositories 240 for storage of information regarding various road parameters, such as, but not limited to, speed limits, one-way vs. two-way information, traffic signal and traffic sign information (e.g., estimated wait times for different times of the day), road hazard or closure information, construction information, and traffic information (e.g., congestions, detours and accident), and the like.

The waypoints module 205 can access waypoint data useful for constructing a route. The waypoint data can include a starting location, a target or destination location, intermediate waypoint locations, landmarks, and the like. The starting and ending location as well as possibly other waypoints can be input by a user of a management device 135. At least some of the waypoints data can also be provided to the waypoints module 205 from the mapping module 115 described above.

The vehicle characteristics module 210 can store vehicle characteristics regarding vehicles in a fleet. These characteristics can be input by a user, for instance. The vehicle characteristics can include, but are not limited to, vehicle energy type based on energy consumption (e.g., gasoline-powered, electric, hybrid, or alternative fuel), vehicle class (e.g., passenger vehicle, commercial truck or trailer, bus), vehicle dimensions, vehicle weight (e.g., unloaded or loaded, estimated or actual), vehicle capacity, vehicle energy functions (e.g., energy regeneration capabilities, limitations on range), maintenance history, and the like.

The vehicle location module 215 can determine location information for each vehicle in the fleet. In one embodiment, this location information is multi-dimensional, such as three-dimensional. For example, the location information can include a latitude component, a longitude component, and an elevation component. The location information can be manually input by a user or can be automatically determined from Global Positioning System (GPS) functionality of the in-vehicle devices 105 or within a mobile device (e.g., a phone) carried by an operator of the vehicle.

The driver profile module 220 can store and/or determine driver characteristics or behavior that affect energy usage. For example, a driver can develop a habit for aggressive driving (e.g., hard, rapid acceleration and deceleration and/or speeding) or for laziness (e.g., long idling times or break times). In some embodiments, the driver profile module can also include data such as age, preferred driving times, preferred days of work, wage information, overtime information, number of years of experience, and the types of vehicles the driver is trained or licensed to operate.

The route calculation module 225 can determine one or more alternative feasible, or candidate, routes from a starting waypoint to a destination waypoint. The feasible routes can be determined using one or more initial searching algorithms based on one or more initial criteria, factors or variables (e.g., distance and/or estimated transit time) to trim down the search space to exclude unreasonable routes. The feasible routes can be determined based on input received from the waypoints module 205, the vehicle type module 210, the vehicle location module 215, the driver profile module 220, and/or the parameter database 240. In some embodiments, the route calculation module 225 identifies a route that selects energy use based on the input received.

The route selection determination methods will be described in more detail below; however, any number of search algorithms or methods can be used without departing from the spirit and/or scope of the disclosure, including but not limited to, breadth-first algorithms, depth-first algorithms, best-first algorithms, Dijkstra's algorithm, the Hungarian (Munkres) algorithm, the A* algorithm, Traveling Salesman-related algorithms, linear programming algorithms, and combinations or modifications of the same. Moreover, any number of data structures can be used to implement the algorithms (e.g., graphs, trees, heaps, stacks, queues, priority queues, combinations of the same, and/or the like). One example search algorithm used to generate feasible routes or optimal routes based on a cost function is described in U.S. Patent Application Publication No. 2010/0153005, filed on Dec. 8, 2009, the disclosure of which is hereby incorporated by reference in its entirety.

The calculated route output module 230 can output the one or more routes identified by the route calculation module 225. The routes can be output to a vehicle-based display unit, a handheld mobile device, and/or to a remote location over the network 145 (e.g., the client computing device 135, the dispatch center 140). In some embodiments, the calculated route output module 230 can output feedback to a driver (e.g., directions, instructions, warnings, alerts, alarms). For example, the calculated route output module 230 can output a real-time suggested driving speed that can minimize or reduce energy use. The output feedback can include voice commands, audible alerts, and/or on-screen text or graphics. The feedback can advantageously change driver behavior to improve energy efficiency and reduce energy use. In some embodiments, the calculated route output module 230 is in communication with, and controls operation of, a display device and/or one or more audio devices.

In some embodiments, the calculated route output module 230 generates audible instructions or signals, thereby permitting a user of an in-vehicle device 105 to follow a route to a destination. Such signals may include, for example, beeps or tones that are generated when a driver approaches a pertinent intersection, or may include verbal directions, such as "turn left ahead." In some embodiments, the verbal directions are in a language the user understands, such as English or French, and the language can be changed by the user of the system based on their personal preferences.

The communication module 235 can facilitate communication by and with the routing module 200 over the network 145. In some embodiments, the communication module 235 receives data from the network 145 and transmits data to the management device 135 and to the in-vehicle devices 105. The communication module 235 can provide the route calculation module 225 with access to network resources or information databases, such as traffic and weather web sites, over the network 145.

The parameter database 240 can include one or more storage databases or other data repositories. In addition to storing the various road parameters described above, the parameter database can store any data that may be used to determine the costs of routes or portions of routes (e.g., legs). The parameter database 240 can be in communication with the route calculation module 225 and any of the other sub-modules of the routing module 200. In some embodiments, the parameter database 240 can be communicatively coupled to the network 145. As one example, the parameter database 240 can include look-up tables of information related to average stop times for traffic lights based on statistical averages. The look-up tables can store different stop times for different times of the day for each traffic light. As another example, the parameter database 240 can store historical or real-time traffic information. As yet another example, the parameter database 240 can store terrain characteristics information, acceleration or deceleration data for various roadway slopes or incline angles and/or weather information.

In other embodiments, the parameter database(s) 240 or other data repositories can reside on the client computing device 135, at the dispatch center 140, within a vehicle 105, or at other remote locations communicatively coupled to the network 145.

IV. Energy-Based Route Selection Processes

Figure 3:
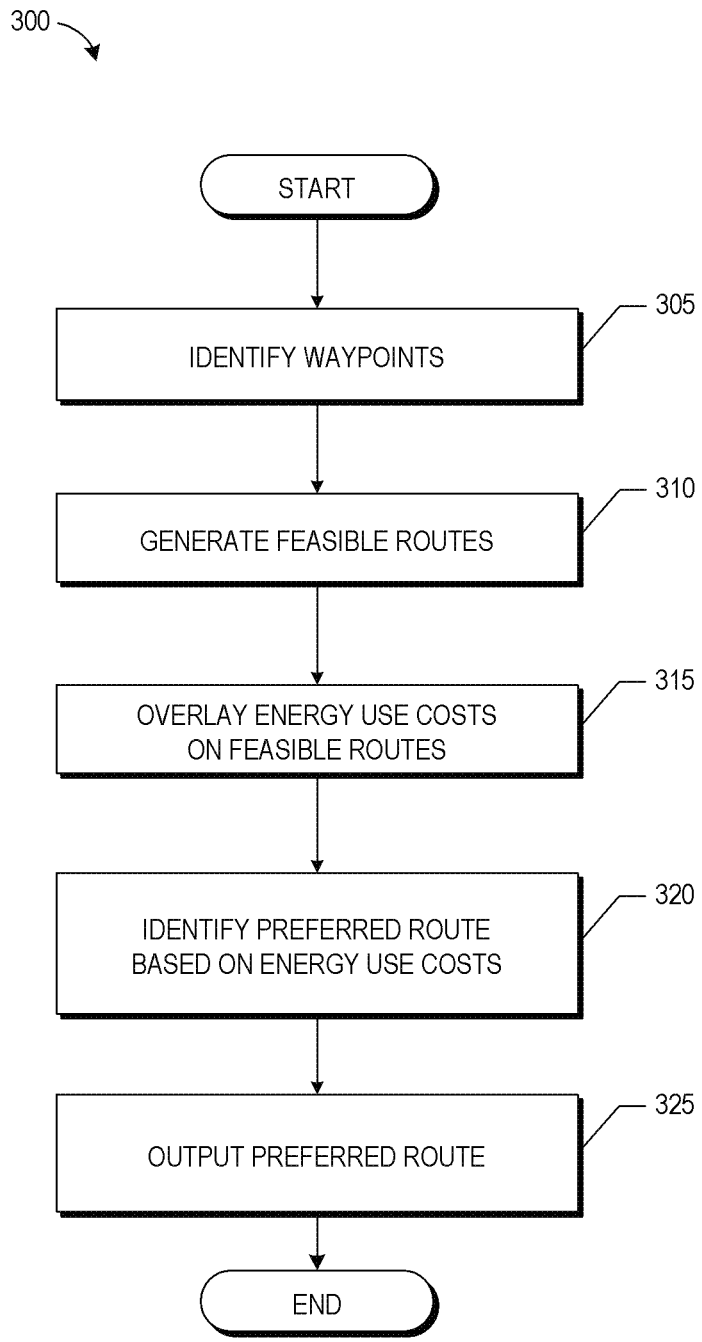
FIGS. 3 and 5 illustrate embodiments of energy usage processes executable by the routing module of FIG. 2.

With reference to FIG. 3, an embodiment of an energy use selection process 300 executable by the routing module 110 or 200 is illustrated. In certain embodiments, the energy use selection process 300 advantageously selects routes to reduce energy use, which can reduce energy costs and improve the environment. In some embodiments, consideration of energy use can be overlaid on top of routes selected for shortest distance and/or shortest estimated transit time to provide a route that meets time deadlines and that reduces energy use at the same time.

At block 305, one or more waypoints are identified, for example, by the waypoints module 205. As described above, the waypoints can be received in real time via manual entry by a user or can be retrieved from a waypoints database or the like. In some embodiments, the waypoints include a starting waypoint and a destination waypoint. In one embodiment, the starting waypoint is a vehicle's current location, which may be provided to the waypoints module 205 by an in-vehicle device 105. The starting waypoint and the destination waypoint can be the same (e.g., a round trip route), but need not be. The waypoints can be modeled as nodes in a graph, where each edge in the graph represents a leg of a route. An example graph having two waypoints is described below with respect to FIG. 4.

Turning to block 310, the route calculation module 225 can generate feasible, or candidate, routes based one or more initial criteria, variables, or factors. For example, the feasible routes can be generated based on shortest distance and/or estimated transit time. In some embodiments, the feasible routes include the routes with the shortest distance and/or shortest estimated transit time. Feasible routes can also include routes having a characteristic within a predefined percentage of the "best" route, such as a route having a time or distance within about 1%, within about 5%, or within about 10% of the calculated best route.

Feasible routes can also be determined based on avoidance of highways, least number of stop signs or stop lights, etc. The generation of feasible, or candidate, routes can provide an initial narrowing down of the universe of possible routes between waypoints to further be selected based on additional criteria or constraints, such as energy use criteria.

As described above, the waypoints in a route can be modeled as a graph. As such, the determination of feasible routes can be performed using one or more initial search algorithms to provide an initial reduction of the total number of possible routes to trim down the search space. For example, the initial reduction can narrow down the possible routes to exclude highly improbable routes (e.g., based on distance and estimated transit time factors, such as described above in connection with block 310). The initial search algorithms can include, for example, Dijkstra's algorithm, Munkres (Hungarian) algorithm, breadth-first algorithms, depth-first algorithms, best-first algorithms, and/or the like. In some embodiments, heuristic search techniques (such as A* search or other such techniques) can be implemented to narrow down the time and complexity of the search for feasible routes.

At block 315, the route calculation module 225 can analyze the feasible routes based on an energy use cost function and overlay the energy-related costs on each route. In some embodiments, the overlay of routes includes calculating or otherwise identifying an energy use cost based on the cost function for each of the feasible routes. The energy use cost function can be an objective function or the like that is based on one or more energy use factors such as terrain or elevation, vehicle characteristics, driver characteristics, road conditions, traffic, speed limits, stop time, turn information, traffic information, and weather information, distance, estimated stop or idling time, driver profile data (e.g., driver average miles per gallon), and the like. The cost function can compute a value for each route or route leg that represents the energy cost of that route. This energy cost can be an actual monetary cost or some arbitrary value other than a monetary value. For routes that include multiple legs between intermediate stops, an energy use cost can be calculated for each leg and the energy use costs for the legs can be summed to generate a total route energy use cost.

To simplify the energy use cost calculation, the different energy use factors can be assigned constant values. For instance, vehicles can be assigned an average vehicle cost per unit time, with different types of vehicles being assigned different costs. Similarly, drivers can be assigned a cost based on the average miles per gallon they tend to consume for a given vehicle. These costs can be associated with vehicle or driver profiles in the parameter data repository 240 described above.

Proceeding to block 320, the route calculation module 225 identifies a preferred route from the feasible routes based on the overlaid energy use costs, thereby selecting a route based on energy use in addition to shortest distance and/or shortest estimated transit time. In some embodiments, the preferred route can be output to an in-vehicle device or to a handheld mobile device of a driver.

In some embodiments, the route with the lowest energy use cost is selected as the preferred route regardless of the distance. In some embodiments, the route with the lowest energy cost is selected as long as the distances of the feasible routes are within a predetermined or user-defined threshold. In some embodiments, the distance factors and the cost factors can be weighted according to a predetermined weighting assignment or based on real-time, user-defined inputs.

It should be noted that routes can be selected based on energy considerations alone in some embodiments, without regard to time or distance concerns. In other embodiments, routes are selected based on energy, time, and/or distance concerns, but the routes are prioritized for one of these concerns (such as energy). For instance, a vehicle may be assigned to deliver goods to five stops in a given day. So long as those stops are made within the day, any route can be selected that prioritizes energy conservation, even if the selected route take longer than the fastest possible route. Waypoints within a route may be prioritized for different criteria. For example, if a route includes 10 waypoints, one of the waypoints may have a strict time requirement while the others do not. Thus, the portion of the route to the time-critical waypoint may be selected or optimized based on time, while other portions of the route may be selected or optimized based on energy consumption.

At block 325, the calculated route output module 230 outputs at least one of the identified routes, for example, to an in-vehicle device 105 or to a driver's mobile device. In some embodiments, outputting the route can also include outputting speed recommendations or other real-time driver feedback for at least portions of the route. Such recommendations can be output to control or attempt to control energy use (see, e.g., FIG. 10).

Figure 4:
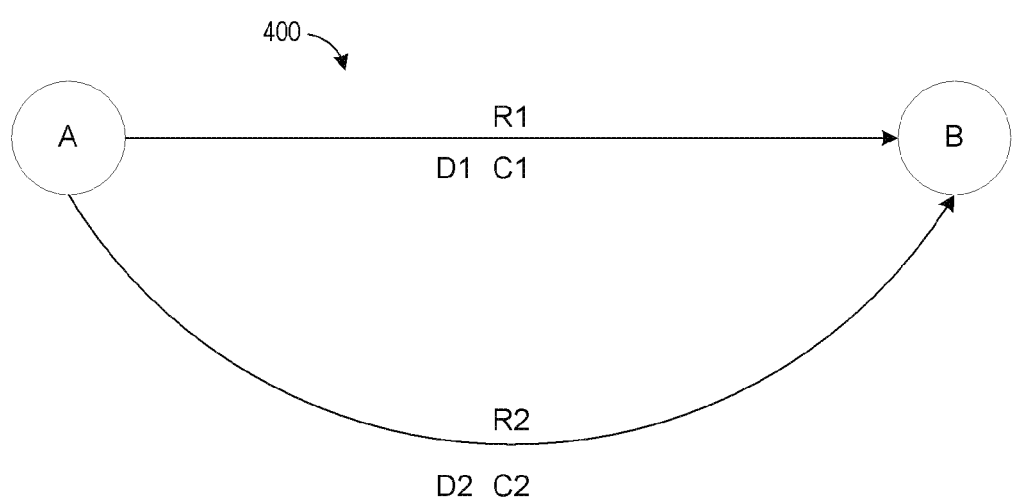
FIGS. 4 and 6-8 illustrate example route selection scenarios.

FIG. 4 illustrates a simplified graph diagram 400 that helps to illustrate the energy use selection process 300 described above. FIG. 4 illustrates a starting waypoint A and a destination waypoint B and two alternative feasible routes R1, R2, which may have been identified by the route calculation module 225. A route can include a starting point and a destination, or ending, point. In some embodiments, the destination point may be the same as the starting point (e.g., a round trip). In some embodiments, a route includes one or more legs connecting one or more desired or required intermediate stops. For example, the stops can include delivery destinations, service destinations, refueling stations, rest stops, and/or the like. The example routes R1, R2 shown include a single leg with no intermediate stops (see, e.g., FIG. 4).

For purposes of illustration, it will be assumed that the alternative feasible routes R1, R2 have been determined based on shortest distance using an initial search algorithm, as described above. Accordingly, the routes R1, R2 are the two routes identified as having the shortest distance. For example, R1 may have a distance of 4.2 miles and R2 may have a distance of 4.4 miles.

As described above, the route calculation module 225 can apply an energy use cost function to the two feasible routes R1, R2 to determine which of the routes R1, R2 would provide a better or more preferred route with respect to least energy use. The energy use cost can be indicative or reflective of energy use (e.g., gallons of fuel, electricity consumption, other energy consumption values, dollar cost). In some embodiments, the energy use cost is represented as an arbitrary number that can be used for comparison of routes or legs. For example, the energy use cost C1 for route R1 can be 6 on a scale from 1 to 10 and the energy use cost C2 for route R2 can be 3. The cost numbers used can be linearly proportional, scale-based, logarithmic, or have any other suitable relationship.

In some embodiments, because both feasible routes R1 and R2 satisfied the initial constraint of shortest distance and/or shortest estimated transit time, then the route with the lowest energy use cost is the route that can be selected as the preferred route. In other embodiments, the energy use cost and the distance and/or time cost are weighted and selected based on a result of a combined overall route cost. The weights may be determined based on relative importance, estimated or actual effect on energy use, or other criteria. The weighting can be based on predetermined criteria or on real-time user-defined input.

As one example, the distance cost D1 of route R1 (on a scale of 1 to 10) can be 4 and the distance cost of D1 of route R2 can be 6. The distance costs can be weighted at 40% and the energy use costs can be weighted at 60%. Thus, the total overall cost of route R1 would be 5.2 and the total overall cost of route R2 would be 4.2. Therefore, route R2 could be selected as the preferred route.

V. Route Selection Based on Terrain Characteristics

Figure 5:
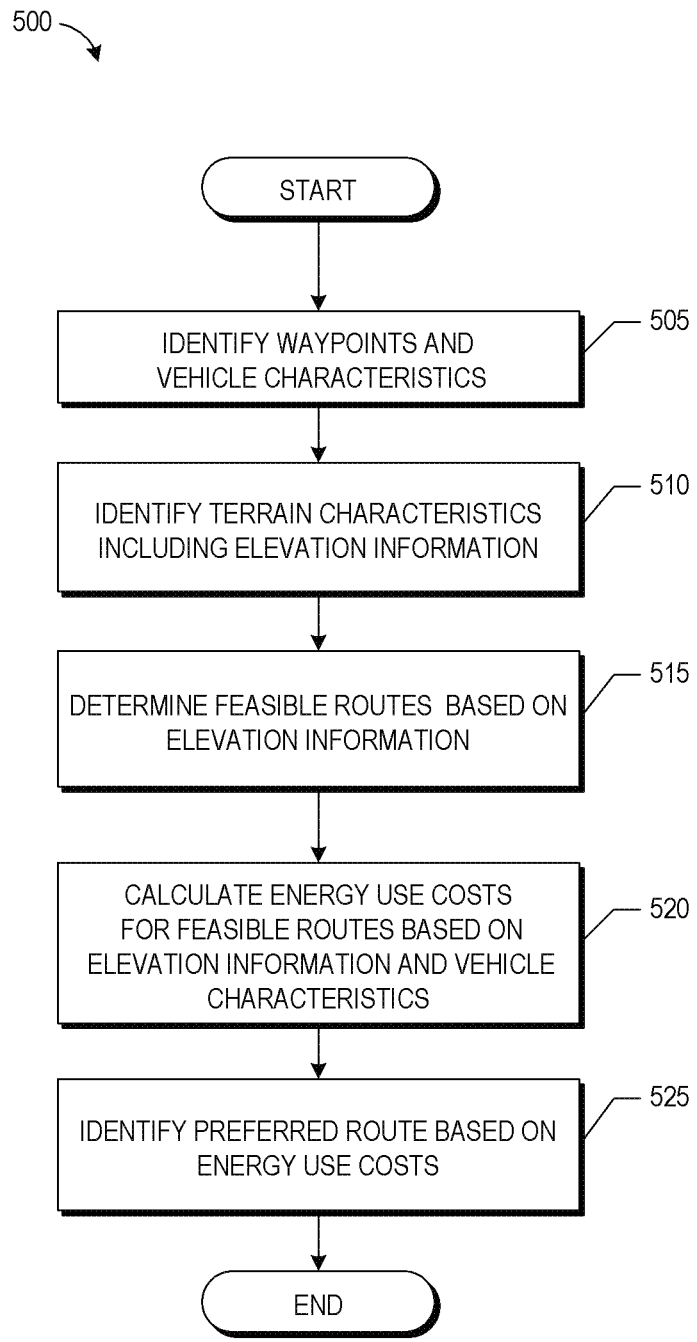
Figure 6:
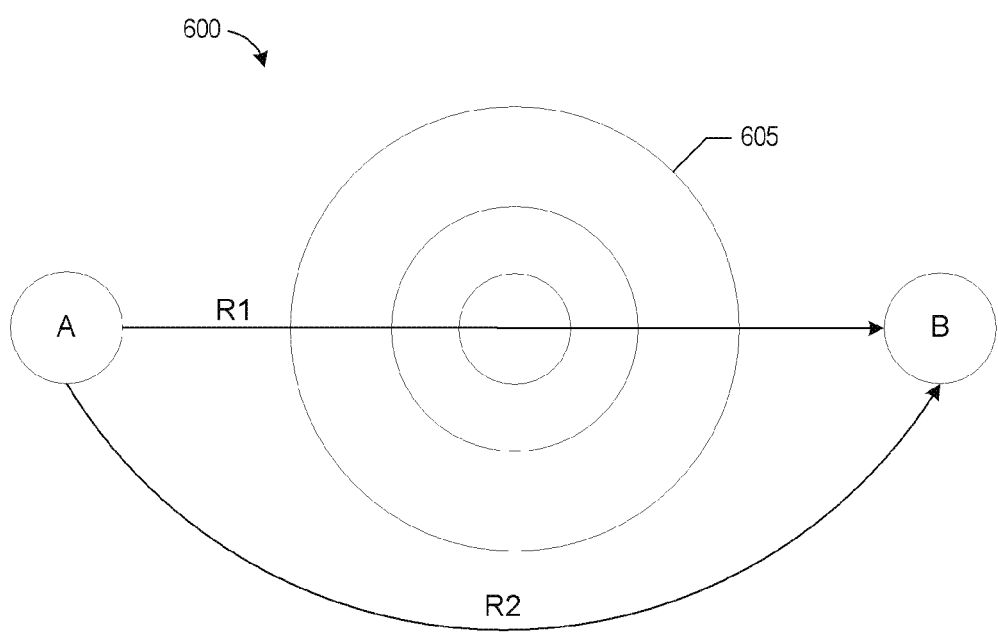

FIGS. 5 and 6 illustrate more detailed embodiments wherein route selection is based, at least in part, on elevation information identified from terrain characteristics. Route selection systems and methods that take elevation changes into account advantageously can provide more accurate estimated transit times and/or energy use costs, thereby providing better routes and decreasing monetary costs. In addition, information regarding elevation changes can influence the type of vehicle selected for a particular route. For example, a hybrid or electric vehicle may be selected for a route with many elevation changes based on its energy regeneration capabilities.

With reference to FIG. 5, a route selection process 500 can identify a preferred route based, at least in part, on elevation information. The route selection process 500 starts at block 505, wherein waypoints and vehicle characteristics are identified. The waypoints and vehicle characteristics can be identified in a similar manner as described above with respect to blocks 305 and 310. In some embodiments, vehicle characteristics are unknown and a vehicle can instead be recommended at the end of the route selection process 500.

Proceeding to block 510, terrain characteristics are identified for the areas surrounding the waypoints identified in block 505. The terrain characteristics, for example, can be received or accessed by the vehicle location module 215. The terrain characteristics can include elevation information. The elevation information can be determined, for example, from GPS or other three-dimensional position or location data. The terrain characteristics, from which the elevation information can be determined, can be received by the vehicle location module 215 over the network 145. In some embodiments, the terrain characteristics and/or elevation information can be accumulated for routes over time or from elevation data available from mapping companies. In some embodiments, the elevation information can be derived from three-dimensional terrain data or maps. The elevation information can be stored in memory or a data repository in communication with the network 145 or otherwise communicatively coupled to the routing module 200.

At block 515, alternative feasible routes are determined based on the elevation information. As described above, the feasible routes can be determined using search algorithms that can select shortest distance and/or estimated transit time. In embodiments wherein estimated transit time is selected, the estimated transit times can be adjusted to account for the elevation changes over the path of the route and the feasible routes determined may differ from the feasible routes that may have been determined without the elevation information.

Energy use costs are determined for the feasible routes using a cost function that is based, at least in part, on elevation information and vehicle characteristics at block 520. The energy use costs can be overlaid on the feasible routes. As described above, the energy use cost may differ depending on a variety of energy use factors.

Proceeding to block 525, a preferred route is identified or selected from the set of feasible routes based on the determined energy use costs. In some embodiments, the route selection process 500 identifies a recommended or preferred vehicle type to use for the preferred route to select or otherwise reduce energy use if a particular vehicle has not been identified at block 510.

FIG. 6 illustrates an example 600 of two feasible routes R1 and R2 between a waypoint A and waypoint B, similar to the example of FIG. 4. The example includes a hilly or mountainous region 605 illustrated by contour lines to show elevation changes. In some embodiments, the route calculation module 225 can determine one or more feasible, or candidate, routes to get from point A to point B. As described above, the feasible routes can be determined based on one or more criteria, factors, or variables. In some embodiments, one or more feasible routes can be determined based on one criterion and another one or more feasible routes can be determined based on another criterion. For example, feasible routes R1 and R2 can be the two routes having shortest distances or feasible route R1 can be determined based on shortest distance and feasible route R2 can be determined by minimizing the elevation changes along the path from point A to point B.

As shown feasible route R1 traverses through the hilly region 605 and, therefore, includes elevation changes. For purposes of illustration, the route R1 has a distance of 10 miles and the route R2 has a distance of 15 miles. Although the route R1 is shorter, it may be more energy efficient to select feasible route R2 over feasible route R1. For example, if an internal combustion vehicle is identified as the vehicle to be used, the fuel required to go up the hill may exceed the fuel required to traverse the longer route. However, for a hybrid vehicle with energy regeneration capabilities, it may be more energy efficient to select the route R1 because the extra energy expended on the way up the hill will be regenerated on the way down the other side of the hill, thus resulting in a total energy use that is less than the energy use required to traverse route R2, which is flat.

In some embodiments, the energy use cost can be dominated by, or based at least in part on, elevation changes of the route. Thus, it may be advantageous to select the route that minimizes elevation changes as the preferred route. The forces acting on a traveling vehicle can include a forward motational force provided by applied energy, a backward drag force (e.g., a velocity-squared force), a downward gravitational force, a downhill acceleration force when the vehicle is on a downward slope, and an uphill deceleration force when the vehicle is on an upward slope. Because it may not be practical to attempt to reduce the drag forces or the gravitational forces on the vehicle (other than perhaps by selecting a different type of vehicle), one way to reduce energy use may be to select a travel route that reduces or minimizes the acceleration and deceleration forces exerted on a vehicle. For uphill slopes, energy is required to compensate for deceleration effects of the slope. For downhill slopes, braking may be required. In order to reduce the energy requirements, a travel route can be selected that reduces or minimizes the energy-consuming elevation changes along the route.

Selecting a route that reduces elevation changes can include determining the "flattest" path on average (e.g., a path having substantially constant elevation from point A to point B). As one example, determining elevation change can be performed by plotting the routes in a manner that includes the elevation changes and then integrating under the curve to identify the total area under the curve. This calculation can then be used to identify routes with the lowest elevation changes. In some embodiments, a lookup table can be generated and stored in memory that associates a particular incline angle or slope with a particular energy use cost based on elevation change.

For some vehicles, such as gasoline vehicles, reducing or minimizing the elevation changes includes selecting the route that has the lowest number of increasing elevation changes because decreasing elevation changes may be beneficial with respect to energy use. Selecting a path with substantially constant elevation can reduce energy use that may occur due to acceleration and (deceleration) braking required for a path having elevation changes to compensate for roadway slope. For other vehicles, such as electric or hybrid vehicles, selecting a route with more elevation changes can improve energy usage due to regenerative effects.

It should be noted that by selecting routes based on energy usage, transportation companies can improve compliance with green or carbon-reduction initiatives.

VI. Other Route Cost Considerations

Although the description above has referred to an energy use cost, the cost of a route is not limited to energy use criteria; other constraints, factors, or variables can be used to determine overall cost using a composite cost function. The cost function can receive as inputs one or more criteria, factors, or variables. The cost function can also be constrained by one or more constraints.

For example, the cost of a route can depend on monetary factors other than energy. Such factors can include driver wage information, overtime information, estimated wear-and-tear or maintenance information (e.g., tire replacement costs, brake replacement costs), tollway costs, and the like. The money component can be a linear function of time; however, at least a portion of the money component can be non-linear (for example, when an overtime period is reached the monetary cost per unit time can deviate from a previous linear function).

In some embodiments, the time component of a cost function can be affected by, but is not limited to, the following: estimated transit time (which may include duration and/or time of day of start of travel), road closure information, road restrictions, hazardous weather information, mandatory break times, scheduling conflicts (e.g., weekends, holidays), and other travel limitations (e.g., portion of route requires travel on a ferry).

The relative importance of the energy use and time or money components can differ based on the circumstances. In some situations, the energy use component may be the most important consideration; however, in situations where time is of the essence to ensure delivery by a particular time, the time component can be most important. In some embodiments, the time can be the most important for one or more legs or portions of the route and then energy use can be the most important for the rest of the route. Thus, the weights assigned to the various factors of the components, or to the components overall, can be dynamic based and modifiable based on the circumstances.

In some embodiments, the cost of the routes is based solely on a single criterion or factor (e.g., distance or estimated transit time). In other embodiments, the cost of the routes is based on two or more criteria or factors (multi-variate analysis). The factors used to determine the cost can be weighted based on importance, estimated or actual effect on energy use, or other criteria. In some embodiments, the cost can include an energy use component, a distance component, a time component, and/or a monetary cost component, as described above. Each of the components can be weighted as an overall component or each of the factors within the components can be individually weighted.

The cost can vary depending on particular vehicle characteristics and/or driving behaviors of particular drivers. For example, the energy use cost of a route may be different for a hybrid or electric vehicle than for a conventional internal combustion vehicle that uses gasoline due to energy efficiency and energy regeneration characteristics and capabilities of the vehicles. As another example, the distance component cost for an electric vehicle may be affected by the limited mileage range of electric vehicles without requiring a recharge. With reference to driving behavior, a particular driver may have a tendency toward aggressive driving that greatly reduces energy efficiency (e.g., miles per gallon) and thus increases energy use cost for the route.

Stop time or idling time of a route can greatly affect a route cost. For example, there can be one or more stop signs or stop lights along a leg of a route, each having an effect on the estimated transit time and/or energy use. For example, the stop signs and stop lights can decrease transit time due to slowing down and/or stopping in compliance with the stop signs and stop lights and can increase energy use due to the fact the vehicle must decelerate and accelerate, which results in loss of conservation of momentum. There may be a single generic cost number for all stop signs, yield signs, traffic lights, or other potential causes of delay. In some embodiments, there is a unique cost number or set of cost numbers for each particular traffic light. The cost associated with a stop sign or stop light can be a static number based on statistical averages that can be determined from a look-up table or other data storage implementation. The look-up table may have different entries for particular stop lights based on time of day.

Stop time or idling time can also refer to the time required for a service vehicle to complete a service job at a particular stop. In some embodiments, the stop time can be predetermined or static. For example, for a water delivery truck, the time to unload new water jugs for a water dispenser from a truck, carry them into a facility, and remove the empty water jugs can be determined to require a predetermined amount of time on average. However, in some embodiments, the stop time can be unknown, such as for a service vehicle that is assigned to repair appliances. In such scenarios, best-guess estimates based on historical data may have to be used for stop times.

The road parameters that can affect cost can include, for example, speed limits, road conditions, traffic information, turn information, and weather information. With respect to speed limits, routes with higher speed limits may increase energy use costs due to velocity-squared losses but may decrease estimated transit time costs. Routes with lower speed limits may decrease energy use costs but may increase estimated transit time costs. The speed limit information may also affect a type of vehicle selected for a particular route. For example, electric or hybrid vehicles may be used for routes with lower speed limits.

With respect to turn information, it may be advantageous to reduce the amount of turns on a route in general. For example, turns generally require a vehicle to slow down, which makes it difficult to conserve momentum and results in losses due to acceleration and deceleration. In addition, it may be advantageous for safety reasons or to reduce time and/or energy costs, to reduce or minimize the amount of either right-hand turns or left-hand turns depending on the side of the road that the vehicle will be driving. For example, for drivers in the U.S., left-hand turns may be reduced to avoid potential collisions in intersections from oncoming traffic and to avoid a potential increase in the stop time due to stop lights.

In some embodiments, the costs are static, based on ideal conditions or statistical predictions. In some embodiments, the costs are dynamic. For instance, the costs for traveling between stops in a road network may vary based on time of day, may vary based on the type of vehicle being driven, may vary based on a particular driver's characteristics, or may vary based on roadway parameters or conditions. As one example of a roadway parameter that may constrain the cost, a specific road may be restricted to passenger cars only. In this example, a semi-truck would be prohibited from traveling on the segment and the cost of traveling the road would, in some embodiments, be infinite (in the graph sense).

As one example of multivariate cost determination, with reference to FIG. 6, the cost of route R1 and R2 can be based on the factors of elevation change and distance. The distance factor can be weighted substantially lower than the elevation change factor to select energy use because the elevation change factor can substantially reduce energy use. For example, the distance factor could be weighted at 20% and the elevation change factor could be weighted at 80%. If the route R1 had a distance cost of 4 and an elevation change cost of 8, then the total cost for route R1 would be 7.2. If the route R2 had a distance cost of 8 and an elevation change cost of 2, then the total cost for route R2 would be 3.2.

As another example of multivariate cost determination with reference to FIG. 6, each route or leg of a route can include an energy use cost, a time cost, and a monetary cost, as described above. In some embodiments, each of the energy use cost, the time cost, and the monetary cost is assigned a weight, as described above. According to the present example, the route R1 can have an energy use cost of 8 due to the elevation changes, a time cost of 2 due to the relatively short distance and a monetary cost of 5 to account for personnel costs (e.g., driver's wages) and vehicle maintenance costs. The route R2 can have an energy use cost of 2 due to the relatively constant slope, a time cost of 8 due to the relatively long distance and a monetary cost of 5.

Depending on the weights assigned to the various cost components, a different optimal route can be identified. If minimization of energy use is determined to be most important, then the energy use cost component can be weighted as 50%, the time cost can weighted as 30% and the monetary cost can be weighted as 20%. With these weights, the total cost of route R1 would be 5.6 and the total cost of route R2 would be 4.4. Therefore, route R2 would be the optimal route. However, if the time component is most important, then the cost components can be weighted as follows: energy use cost—20%, time cost—60% and monetary cost—20%. With these weights, the total cost of route R1 would be 3.8 and the total cost of route R2 would be 6.2. Therefore, route R1 would be the preferred or optimal route.

In some embodiments, the weights for each of the factors can be predetermined. In some embodiments, the weights are variable or constrained in real time based on, but not limited to, user input, stop characteristics (e.g., number of stop signs or traffic lights, statistical wait time for traffic lights), vehicle characteristics, driver characteristics, road parameters, speed limits, time of day, and/or other predetermined or real time criteria. For example, the weight for idling time for an electric vehicle may be substantially lower in proportion to the weight for idling time for an internal combustion vehicle. As another example, an aggressive driver with a driver profile of a hard accelerator and low miles per gallon can affect the weight assigned to the elevation change factor or the number of stops factor.

In accordance with some embodiments, the weights can be adjusted or at least based in part, on user input. For example, a user interface display can be presented to the user. The user interface can receive user input (e.g., textual input selections from a drop-down menu, checked boxes, etc.) that can provide operator override of the routing selection methods. The user inputs can be received from any user input device (e.g., keyboard, mouse, microphone, touchscreen). As one example, a particular stop on a route may have a mandatory delivery time. Accordingly, a user can provide input that causes the routing module 200 to adjust the weights of the factors such that a route is selected that minimizes or reduces estimated transit time (e.g., the time cost component).

In some embodiments, a user can also provide input regarding the vehicle type to be used to calculate one or more routes. In some embodiments, the user interface allows for operator override to provide inputs that effect a change in the route as desired and/or required. In some instances, the operator override inputs may cause the routing module 200 to ignore the weighting altogether. The input received from the user can be received or accessed by the dynamic re-routing process 1000, thereby providing operator-activated re-routing.

VII. Global Route Selection Examples

Figure 7:
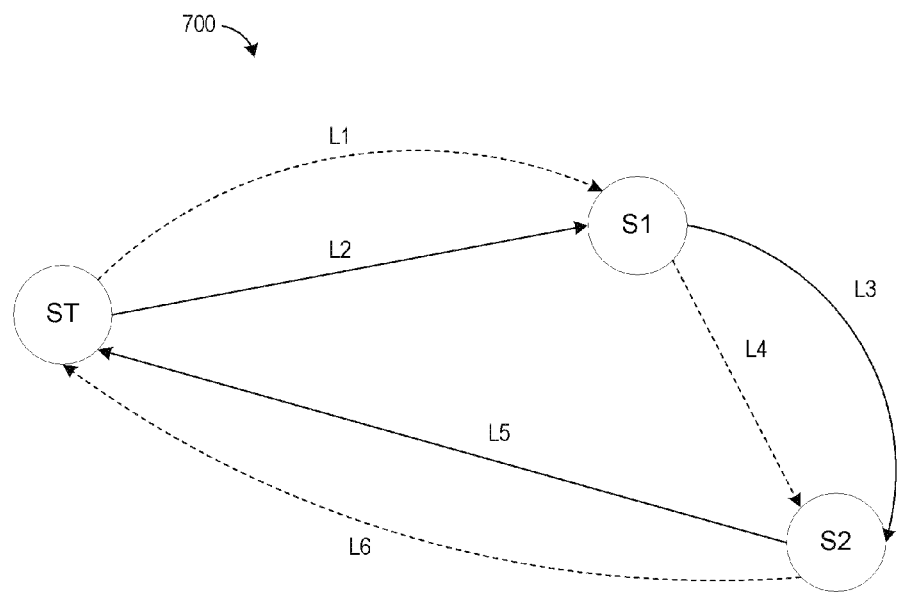
Figure 7:
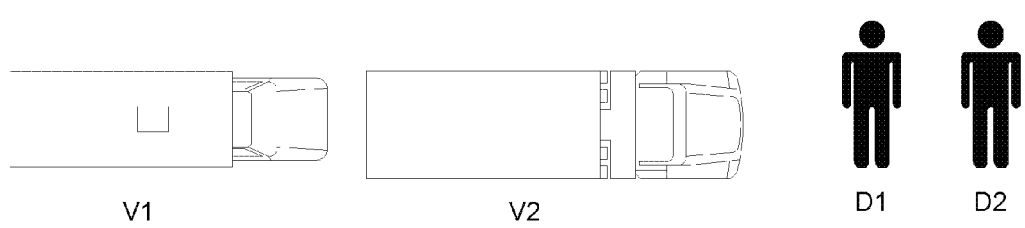
Figure 8:
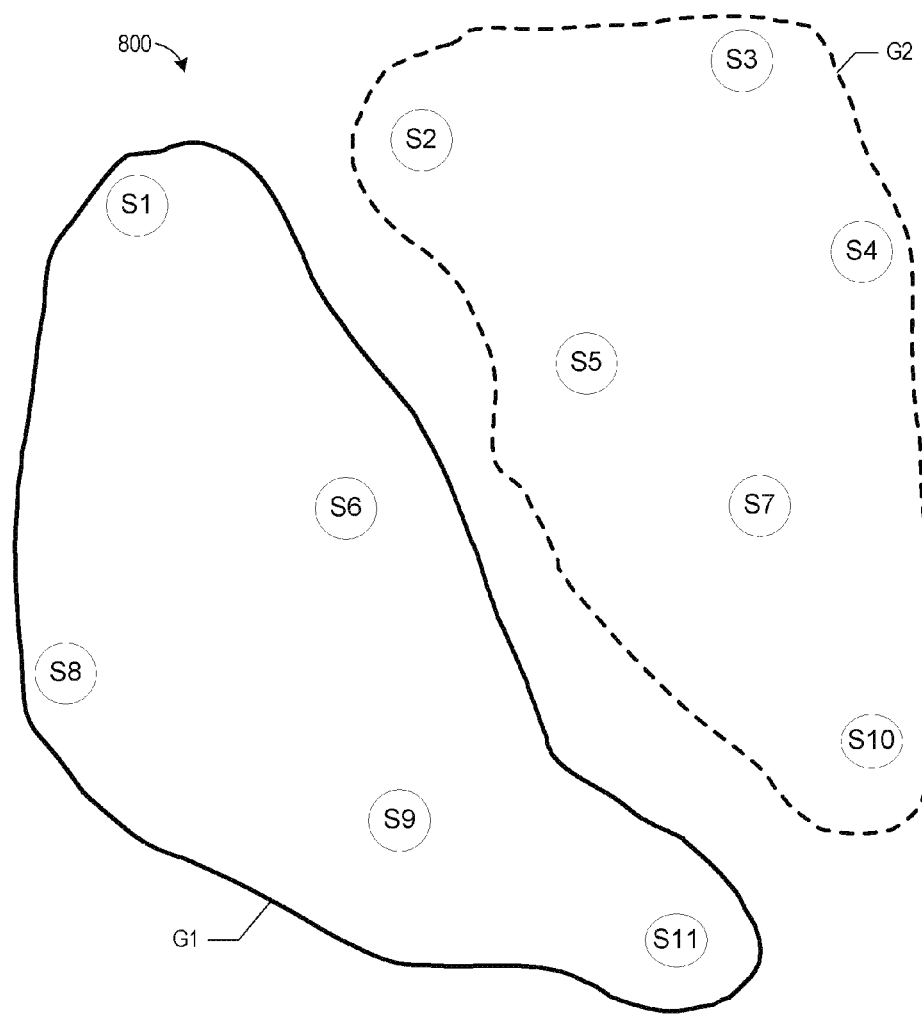
Figure 8:
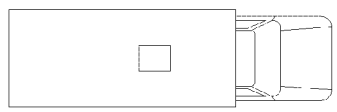
Figure 8:
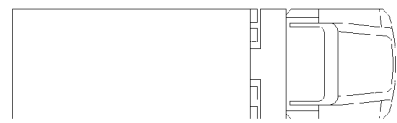
Figure 8:
Figure 8:
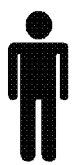

FIGS. 7 and 8 depict diagrams that help to illustrate examples of calculation of feasible, or candidate, routes and identification of preferred routes having lower costs. FIG. 8 helps to illustrate embodiments where the route selection methods can be extended to identify route/vehicle/driver combinations to select energy use.

With reference to FIG. 7, a graph or map 700 is illustrated that includes a starting point ST, an ending point (which in this example is the same as the starting point ST because the starting point is a dispatch center), and two intermediate stops S1 and S2. In some embodiments, an optimal or preferred route can be determined for a predetermined vehicle to make both intermediate stops and return to the starting point while reducing or minimizing energy use.

The graph 700 illustrates two alternative feasible legs between each pair of stops, or nodes. As described above, the feasible legs can be determined based on an initial selection process (e.g., to identify routes with the shortest distance or time). An overlay leg cost can be determined for each of the feasible legs as described above. For example, the leg cost can include an energy use cost. The solid lines represent the preferred legs of the feasible legs determined by route selection methods to have the lowest energy use cost for a predetermined vehicle. The dashed lines represent feasible, but non-preferred or non-optimal, legs or paths that were not selected to be included in the preferred, or optimal, route.

In some embodiments, a preferred route can be determined using one or more search algorithms to identify the sequence and path of legs between the stops that reduces minimizes energy use. Any search algorithm that identifies a shortest path (or approximately shortest path) according to edge weights in a graph can be used. In the illustrated example, the preferred route for the predetermined vehicle is ST to S1 to S2 and then back to ST. The terms "optimal," "optimized," and their derivatives, in addition to having their ordinary meaning, when applied to route selection can refer to a good or better route selection that is better than other routes.

FIG. 7 also displays two vehicles that could be used to travel a route that includes the two stops. In some embodiments, vehicle V1 is a hybrid or electric vehicle and vehicle V2 is an internal combustion vehicle. In some embodiments, the route calculation module 225 generates preferred or optimal routes for each vehicle and identifies a route/vehicle combination that would minimize energy use.

FIG. 7 further displays two drivers D1 and D2 that are available to be selected to operate the vehicles V1 and V2. In accordance with some embodiments, the route calculation module 225 determines an optimal route for each driver/vehicle combination and identifies a route/vehicle/driver combination that would minimize or reduce energy use. In this simplified example, the route calculation module 225 can generate four routes R1-R4 as follows:

R1: Optimal route for Vehicle 1 with Driver 1
R2: Optimal route for Vehicle 1 with Driver 2
R3: Optimal route for Vehicle 2 with Driver 1
R4: Optimal route for Vehicle 2 with Driver 2

The route calculation module 225 can then identify a preferred route from routes R1 to R4 that minimizes or reduces energy use (e.g., has the lowest energy use cost). Although two stops are illustrated as an example, the features and methods described can be used for routes having one, two, three, four or more than four stops. In addition, the features and methods described can be used for more than two vehicles and/or more than two drivers.

Turning to FIG. 8, a map 800 is shown that illustrates global route selection for a fleet of vehicles. In the example shown in map 800, the fleet includes two vehicles and two drivers; however, this example is merely illustrative, and the fleet can include one or more than two vehicles and one or more than two drivers in more detailed implementations.

In accordance with some embodiments, the routing module 200 (alone or in combination with other modules such as the fleet management module 200) can take a list of arbitrarily located stops and automatically generate selected routing for a fleet of vehicles and drivers. Each of the vehicles has associated vehicle characteristics that may affect the selection of the routes. Similarly, each of the drivers has associated driver characteristics that may affect the selection of the routes. The routing module 200 can identify a list or set of arbitrarily located stops and determine or select one or more preferred or selected route/vehicle/driver combinations to cover all of the stops in the most energy efficient manner. In some embodiments, for a fleet of J vehicles required to make M total stops, the routing module 200 can identify a preferred route for each vehicle J having N stops that has the lowest energy use estimate, wherein the number of stops N is a subset of the number of M total stops.

In the illustrated example, the routing module 200 grouped the list of stops into two subsets or groups G1, G2. Group G1 includes six stops (S2, S3, S4, S5, S7, and S10) and group G2 includes (S1, S6, S8, S9 and S11). Although not shown, the routing module 200 also selected one of the vehicles V1, V2 and one of the drivers D1, D2 for each of the groups G1, G2 of stops to reduce or minimize the energy use required to visit all of the stops.

The vehicles selected to be assigned to particular groups of stops can be determined based, at least in part, on vehicle type. Non-regenerative electric vehicles may be used, for example, for trips that are the shortest distance and have the flattest average slope. Internal combustion vehicles may be used, for example, for trips that involve the lowest number of idling minutes, the shortest distance and have the flattest average slope. For example, in some embodiments, the routing module 200 can assign regenerative electric or hybrid vehicles to travel in hilly regions with many elevation changes or for routes with significant idling time to reduce energy use for the routes. Electric and most hybrid vehicles may not consume any energy or may consume minimal energy compared to internal combustion vehicles when stopped and idling. Regenerative features on some hybrid vehicles and electric vehicles include using their motors as brakes and converting the braking energy to electricity for charging the batteries.

In some embodiments, it may be advantageous from an energy use standpoint to assign electric and/or hybrid vehicles to all the routes; however, the electric and/or hybrid vehicles may not be able to carry the load capacity that an internal combustion vehicle could. In addition, the electric vehicles may have limited range without recharging the battery. Accordingly, there may be a tradeoff between energy use, capacity, and range limitations that is factored into the selection of the routes.

In some embodiments, the routing module 200 does not allow a stop to be visited more than once; however, in some embodiments, the routing module 200 does allow a stop to be visited more than once. For example, if multiple items are required to be delivered to a particular stop, it may be more efficient to have multiple vehicles coming from various locations deliver the separate items to the same stop (for example, if time is of the essence).

As described above, the costs of the routes can be determined based, at least in part, on one or more cost components (e.g., energy use, time, distance and monetary), each of which may include one or more factors or variables (e.g., elevation changes, driver profiles, vehicle characteristics, estimated transit time, personnel costs, vehicle maintenance costs, etc.). The costs can also be determined based on vehicle characteristics, driver characteristics, road parameters, or other factors, as described above.

VIII. Dynamically Adjustable Routing

Figure 9:
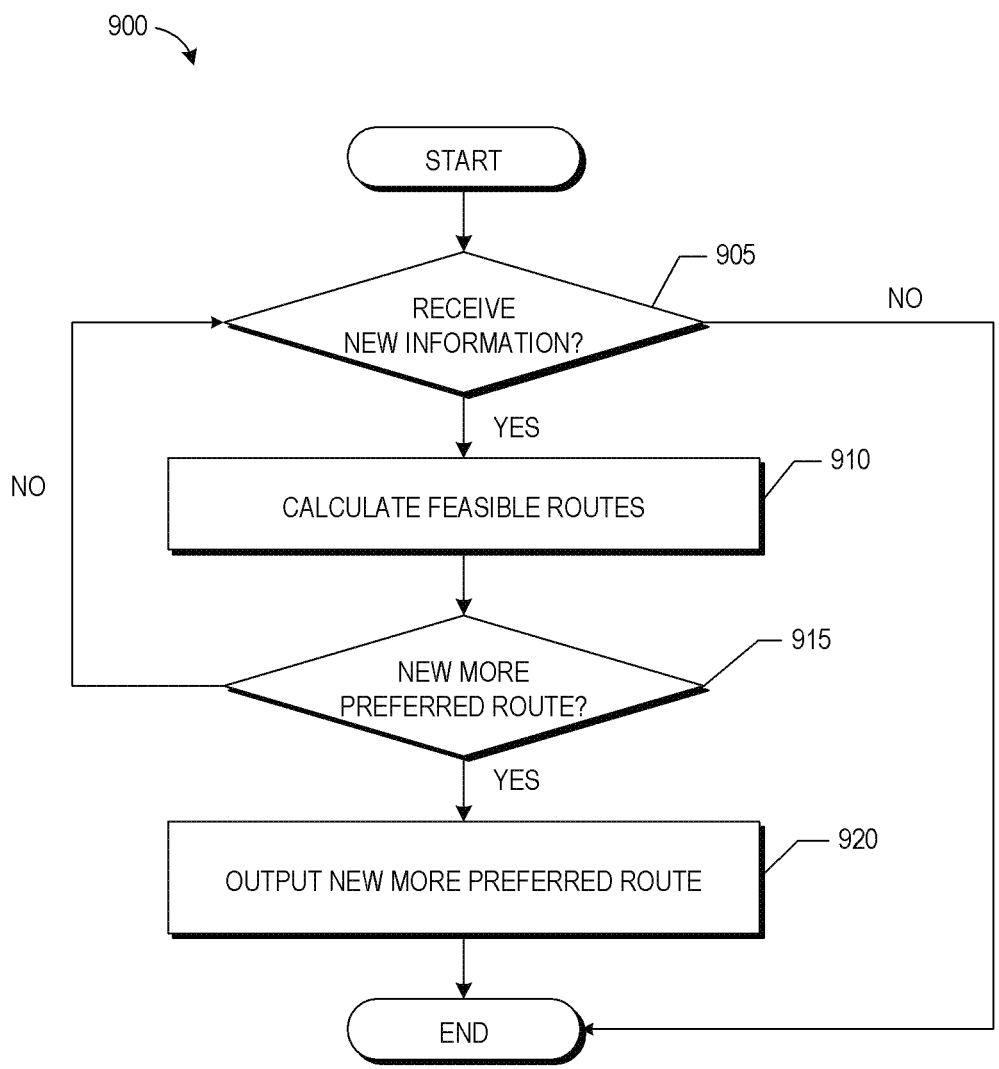
FIG. 9 illustrates an embodiment of a dynamic re-routing process executable by the routing module of FIG. 2.

FIG. 9 illustrates an embodiment of a dynamic re-routing process 900 executable by the routing module 110 or 200. In some embodiments, it may be desirable to identify a new preferred route during the course of travel. For example, it may be possible for delivery and enterprise company vehicles to have the ability to receive re-routing information in real time to provide dynamically adjustable routing. For example, an accident can occur on the route identified before commencing travel such that it no longer remains the optimal route.

Further, in some situations, a user may want to select a single leg or portion of a route to select one factor (e.g., transit time) even though the overall route is selected for a different factor (e.g., energy use). For example, a particular stop along the route can be identified by a user as a stop requiring mandatory delivery at a particular time, which may result in selecting a route that, for at least a portion of the route, shortens transit time at the expense of energy use. The dynamic re-routing process 900 illustrates one embodiment in which new optimal routes can be generated in real time based on changes to the energy use factors, and therefore, the costs of various legs or routes.

The dynamic re-routing process 900 begins at decision block 905, where the routing module 200 waits for new information to be received that may affect the cost (e.g., energy use estimate) of the current identified route. The received information can include, for example, road closure information, detour information, construction information, accident information, road hazard information, hazardous weather information, and/or the like. In some embodiments, the received information designates a particular stop along the route as requiring mandatory delivery by a specific time. This information may be received via user input. In some embodiments, the new potential re-routing information is received by the vehicle location module 215 over the network 145 (e.g., from a tracking module of the dispatch center 140).

In scenarios where routes of multiple vehicles of a large enterprise fleet are being selected, re-routing information may be generated at a centralized dispatch center or routing center and transmitted to the vehicles because the individual drivers may not have information about road conditions on upcoming legs of the drivers' routes. The centralized dispatch center can include a display that shows where some or all of the vehicles of a fleet are currently located and where there are issues of traffic congestion, construction, detours, accidents, etc. The centralized dispatch center may advantageously be able to determine if vehicles have sufficient fuel or battery capacity to complete the route if re-routed. In some embodiments, the vehicles can receive re-routing information (e.g., traffic information, weather information) from a third-party application accessible over a communications network and not from a centralized company routing center. The centralized dispatch center can implement the features of the vehicle management system 110 described above with respect to FIG. 1.

Once new information is received or identified, the dynamic re-routing process 900 proceeds to block 910. At block 910, the route calculation module 225 calculates a new set of alternative feasible routes based on the current location of the vehicle and the received information and determines the cost (e.g., energy use cost) of each feasible route. The feasible route and cost determination can be performed as described above. At decision block 915, the route calculation module 225 determines whether there is a new more preferred route based on the determined route costs. If so, the calculated route output module 230 can output the newly identified route to the driver (e.g., on a display of the in-vehicle device 105) at block 920. If not, the re-routing process proceeds back to decision block 905 to wait for new information to be received.

IX. Driver Feedback and In-Vehicle Device Display

Figure 10:
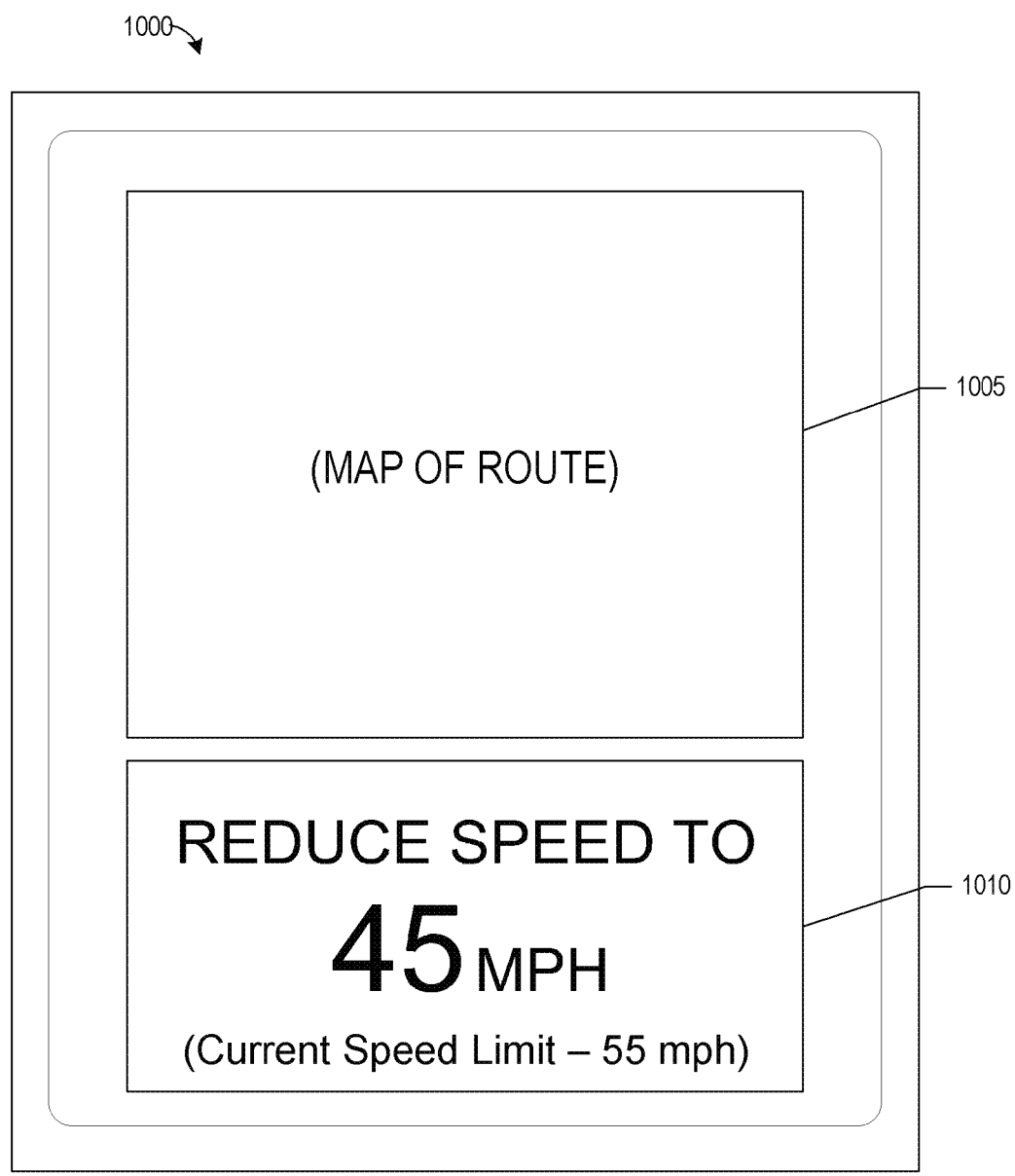
FIG. 10 illustrates an embodiment of a user interface display for providing driver feedback.

As discussed above, it may be advantageous to provide feedback to drivers to provide increased awareness of energy use and to further decrease energy use. With reference to FIG. 10, a portion of an example user interface 700 is shown. The user interface can be output on the in-vehicle device 105 described above.

In the depicted embodiment, the user interface 1000 includes a map portion 1005 and a feedback portion 1010. The map portion 1005 can display a street map with visual aids or directions that update in real time as the driver travels, thereby showing the driver's progress. The map portion 1005 can display one or more routes, which may include one or more intermediate stops. The visual aids can include arrows or similar colored lines overlaid over a street map.

The feedback portion 1010 can display visual instructions or alerts to a user (e.g., a driver). The feedback portion 1010 may display turn-by-turn instructions (not shown). In some embodiments, the turn-by-turn instructions can be audibly announced in real time to alert the driver. In some embodiments, as shown in FIG. 10, the feedback portion 1010 can display a recommended vehicle driving speed to further decrease energy use (e.g., minimize velocity squared losses, maximize fuel efficiency). In some embodiments, the feedback portion can provide predictive driving tips designed to reduce energy use.

For example, the feedback portion 1010 can provide real-time vehicle speed recommendations designed to provide conservation of momentum and energy when traversing a hill. As a driver of an internal combustion vehicle is approaching a hill, the feedback portion 1010 can display a recommended speed that is equal to or close to the posted maximum speed limit in order to build up momentum to counteract the deceleration forces that will impact the vehicle as the vehicle climbs up the hill. As the vehicle makes its way up the hill, the recommended vehicle speed can gradually decrease until it reaches, for example, a minimum safe speed, near the crest of the hill. For example, the user interface display can include on-screen text that says "Reduce speed to XX MPH." The speed of the vehicle can advantageously be adjusted to balance the kinetic energy and potential energy components of the total energy of the vehicle as it traverses the hill.

In some embodiments, the recommended vehicle driving speed is lower than the posted speed limit. For example, the recommended vehicle driving speed can be between about 80% and about 95%, between about 75% and about 90%, and/or between about 85% and about 100% of the posted speed limit. Other ranges may be used in other implementations. In order to incentivize drivers to drive at the recommended vehicle driving speed, especially if it is lower than the posted speed limit, a bonus may be offered to drivers who follow the recommended speeds. In some embodiments, the actual speeds are monitored to ensure compliance with the recommended driving speeds and non-compliant drivers can be punished. In some embodiments, an audible alert can sound if the driver exceeds the recommended driving speed. In some embodiments, an alert can be transmitted to a centralized monitoring station or routing center if a driver is consistently not complying with the recommended driving speeds.

The real-time driver feedback can advantageously help facilitate adjustment of driver habits and correct lack of understanding by drivers as to how to minimize energy use. The real-time driver feedback can help make drivers aware of how to minimize energy expended. The recommended driving speeds and alerts can help to control driving style and change driver habits to minimize energy use. Drivers may be more likely to exhibit driving behavior that minimizes energy use if they are able to see the effects of their driving behavior in real time. Some drivers may view the system with the driver feedback as a sort of competitive "game," which may aid in compliance.

The user interface 1000 can include, but is not limited to, an LCD display, a heads-up display, an LED display, a 2D display, and/or a 3D display to instruct a user of the system which way to travel. In some embodiments, images displayed on the map portion 1005 simulate motion, such as a vehicle traveling down a city street. In some embodiments, the screen is interactive. For example, in some embodiments the user can input his current and destination locations, can update costs for given streets or routes, or can change his destination en route, as described above.

In some embodiments, the routing module 200 and the user interface 700 are integrated into a vehicle navigation system or similar system. For example, in some embodiments, the visual outputs of the calculated route output module 230 are output via the vehicle's in-dash video display, and/or the audio outputs of the calculated route output module 230 are output via the car's audio speakers.

In other embodiments, the user interface 1000 is integrated within a mobile handheld device in communication with the network 145. In some embodiments, a vehicle or similar device is controlled directly by the routing module 200.

For example, the routing module 200 can generate control instructions and transmit those control instructions directly to a vehicle's engine, steering, braking, and other components to control these components and to maintain the vehicle on the desired path.

X. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method for optimizing energy use of a powered vehicle, the method comprising:
    by a computer system comprising computer hardware,
        determining navigation instructions to navigate the powered vehicle along a transportation route connecting a plurality of stops via a network of streets in a geographic region;
        outputting the navigation instructions for presentation to a driver of the powered vehicle;
        determining a vehicle speed recommendation for at least a portion of the transportation route, the vehicle speed recommendation being different from the navigation instructions and being calculated to reduce energy use by the powered vehicle along the portion of the transportation route, the vehicle speed recommendation being lower than a posted speed limit for the portion of the transportation route; and
        outputting the vehicle speed recommendation for presentation to the driver while the powered vehicle travels along the portion of the transportation route.

2. The method of claim 1, wherein the vehicle speed recommendation is between 75% of the posted speed limit and 90% of the posted speed limit.

3. The method of claim 1, wherein the vehicle speed recommendation is calculated based, at least in part, on terrain characteristics of the portion of the transportation route.

4. The method of claim 3, wherein the terrain characteristics comprise a change in elevation on the portion of the transportation route.

5. The method of claim 1, wherein the navigation instructions comprise turn-by-turn directions for operating the powered vehicle.

6. The method of claim 1, further comprising generating and outputting an alert for presentation to the driver in response to determining that the driver did not comply with the vehicle speed recommendation.

7. The method of claim 6, wherein the alert is an audible alert.

8. The method of claim 1, wherein the navigation instructions and the vehicle speed recommendation are output for presentation on a display positioned inside the powered vehicle.

9. A system for optimizing energy use of a powered vehicle, the system comprising:
processing circuitry comprising physical computer hardware configured to:
determine navigation instructions to navigate the powered vehicle along a transportation route connecting a plurality of stops via a network of streets in a geographic region;
output the navigation instructions for presentation to a driver of the powered vehicle;
determine a vehicle speed recommendation for at least a portion of the transportation route, the vehicle speed recommendation being different from the navigation instructions and being calculated to reduce energy use by the powered vehicle along the portion of the transportation route, the vehicle speed recommendation being lower than a posted speed limit for the portion of the transportation route; and
output the vehicle speed recommendation for presentation to the driver while the powered vehicle travels along the portion of the transportation route.

10. The system of claim 9, wherein the vehicle speed recommendation is between 75% of the posted speed limit and 90% of the posted speed limit.

11. The system of claim 9, wherein the vehicle speed recommendation is calculated based, at least in part, on terrain characteristics of the portion of the transportation route.

12. The system of claim 11, wherein the terrain characteristics comprise a change in elevation on the portion of the transportation route.

13. The system of claim 9, wherein the navigation instructions comprise turn-by-turn directions for operating the powered vehicle.

14. The system of claim 9, wherein the processing circuitry is configured to generate and output an alert for presentation to the driver in response to determining that the driver did not comply with the vehicle speed recommendation.

15. The system of claim 14, wherein the alert is an audible alert.

16. The system of claim 9, wherein the processing circuitry is configured to output the navigation instructions and the vehicle speed recommendation for presentation on a display positioned inside the powered vehicle.

* * * * *